United States Patent
Wheeler (10) Patent No.: US 10,584,460 B1
(45) Date of Patent: Mar. 10, 2020

(54) UNDERWATER ANCHORING ASSEMBLY AND METHODS

(71) Applicant: TorcSill Foundations, LLC, Pasadena, TX (US)

(72) Inventor: Aaron Wheeler, Pasadena, TX (US)

(73) Assignee: TORCSILL FOUNDATIONS, LLC, Pasadena, TX (US)

(*) Notice: Subject to any disclaimer, the term of this patent is extended or adjusted under 35 U.S.C. 154(b) by 0 days.

(21) Appl. No.: 16/274,027

(22) Filed: Feb. 12, 2019

(51) Int. Cl.
| | | |
|---|---|---|
| *F16L 1/20* | (2006.01) | |
| *F16L 1/06* | (2006.01) | |
| *E02D 27/52* | (2006.01) | |
| *F16L 3/02* | (2006.01) | |
| *F16L 1/16* | (2006.01) | |
| *E02D 27/50* | (2006.01) | |
| *E21B 43/01* | (2006.01) | |
| *B63B 21/50* | (2006.01) | |

(52) U.S. Cl.
CPC .......... *E02D 27/525* (2013.01); *E02D 27/50* (2013.01); *F16L 1/06* (2013.01); *F16L 1/16* (2013.01); *F16L 1/201* (2013.01); *F16L 3/02* (2013.01); *B63B 21/50* (2013.01); *E21B 43/01* (2013.01)

(58) Field of Classification Search
CPC ..... F16L 1/201; F16L 1/06; F16L 1/10; F16L 1/11
USPC .............................................. 405/172, 184.4
See application file for complete search history.

(56) References Cited

U.S. PATENT DOCUMENTS

| | | | | | |
|---|---|---|---|---|---|
| 1,831,306 | A | * | 11/1931 | Kakimoto | A01G 25/00 242/157 R |
| 3,810,364 | A | * | 5/1974 | Johnson | F16L 1/06 138/106 |
| 3,841,105 | A | * | 10/1974 | Cannon | F16L 1/201 405/172 |
| 3,903,704 | A | * | 9/1975 | Spiridonov | E02D 27/46 248/49 |
| 4,252,466 | A | * | 2/1981 | Berti | F16L 1/20 405/172 |
| 4,268,189 | A | * | 5/1981 | Good | F16L 1/06 138/105 |

(Continued)

FOREIGN PATENT DOCUMENTS

| | | | | |
|---|---|---|---|---|
| EP | 0018898 | A1 * | 11/1980 | E02D 27/46 |
| EP | 0094325 | A1 * | 11/1983 | F16L 1/201 |

*Primary Examiner* — Frederick L Lagman
(74) *Attorney, Agent, or Firm* — MH2 Technology Law Group LLP (57) ABSTRACT

An underwater anchoring assembly and method for supporting a pipe with the underwater anchoring assembly are disclosed. The underwater anchoring assembly includes a first pile, a second pile, a first cross-member coupled with the first and second piles, and a second cross-member rotatably coupled with the first pile at a first end portion thereof, and detachably coupled with the second pile at a second end portion thereof. The method includes advancing the underwater anchoring assembly into the ground in an unactuated state, positioning the first cross-member above the pipe, rotating the second cross-member about the first pile such that the pipe is interposed between the first and second cross-members, and coupling the second end portion of the second cross-member with the second pile via a fastening mechanism to thereby support the pipe.

23 Claims, 7 Drawing Sheets

(56) References Cited

U.S. PATENT DOCUMENTS

| | | | | |
|---|---|---|---|---|
| 4,338,045 A | * | 7/1982 | Cour | F16L 1/20 |
| | | | | 138/105 |
| 4,389,034 A | * | 6/1983 | Suttles | F16L 1/201 |
| | | | | 248/49 |
| 5,263,796 A | * | 11/1993 | de Waal | F16L 1/201 |
| | | | | 248/49 |
| 5,290,127 A | * | 3/1994 | Foster | F16L 1/20 |
| | | | | 248/49 |
| 5,730,552 A | * | 3/1998 | Johannesson | F16L 1/06 |
| | | | | 248/49 |
| 5,785,457 A | * | 7/1998 | Thompson | F16L 1/201 |
| | | | | 248/72 |

* cited by examiner

UNDERWATER ANCHORING ASSEMBLY AND METHODS

BACKGROUND

Underwater pipelines and pipes thereof are fabricated from rigid materials that provide a relatively limited range of movement before structural damage to the pipelines and pipes thereof occur. Excessive movement (e.g., axial, lateral, etc.) of the pipelines or the pipes thereof may cause the pipes to rupture or tear away from a terminal, such as a drilling platform. As such, underwater anchoring assemblies are often deployed to support and stabilize the pipelines. Such anchoring assemblies are designed to support underwater pipelines against buoyancy, movement (e.g., axial, lateral, etc.), and/or sagging, by engaging and restraining the pipelines against these excessive movements.

While underwater anchoring assemblies are effective in preventing the excessive movement of the pipelines, installing the underwater anchoring assemblies, however, is a time-consuming and cost prohibitive process. In particular, installing conventional underwater anchoring assemblies may often require extensive underwater welding by specialized divers.

SUMMARY

Embodiments of the disclosure may provide an anchoring assembly for supporting a pipe. The anchoring assembly may include a first pile configured to be installed into a ground, a second pile configured to be installed into the ground, a first support coupled with the first and second piles, and a second support at least partially disposed below the pipe. The first support may include a first cross-member configured to be disposed above the pipe. The second support may be configured to at least partially prevent movement of the pipe relative to the anchoring assembly.

Embodiments of the disclosure may also provide an anchoring assembly for a pipe. The anchoring assembly may include a first pile installed into a ground, a second pile installed into the ground, a first cross-member coupled with the first and second piles, and a second cross-member rotatably coupled with the first pile at a first end portion thereof, and detachably coupled with the second pile at a second end portion thereof. The first cross-member may be configured to be disposed above the pipe, and the second cross-member may be configured to be disposed below the pipe.

Embodiments of the disclosure may provide a method for supporting a pipe with an anchoring assembly. The method may include advancing the anchoring assembly into the ground in an unactuated state, wherein the anchoring assembly includes a first pile, a second pile, a first cross-member coupled with the first and second piles, and a second cross-member rotatably coupled with the first pile at a first end portion thereof, and detachably coupled with the second pile at a second end portion thereof. The method may also include positioning the first cross-member above the pipe. The method may further include rotating the second cross-member about the first pile such that the pipe is interposed between the first and second cross-members, after advancing the anchoring assembly into the ground. The method may also include coupling the second end portion of the second cross-member with the second pile via a fastening mechanism to thereby support the pipe with the anchoring assembly, after advancing the anchoring assembly into the ground.

BRIEF DESCRIPTION OF THE DRAWINGS

The accompanying figures, which are incorporated in and constitute a part of this specification, illustrate embodiments of the present teachings and together with the description, serve to explain the principles of the present teachings. In the figures.

It should be noted that some details of the figure have been simplified and are drawn to facilitate understanding of the embodiments rather than to maintain strict structural accuracy, detail, and scale.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one embodiment may be used in any other embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Figure 1A:
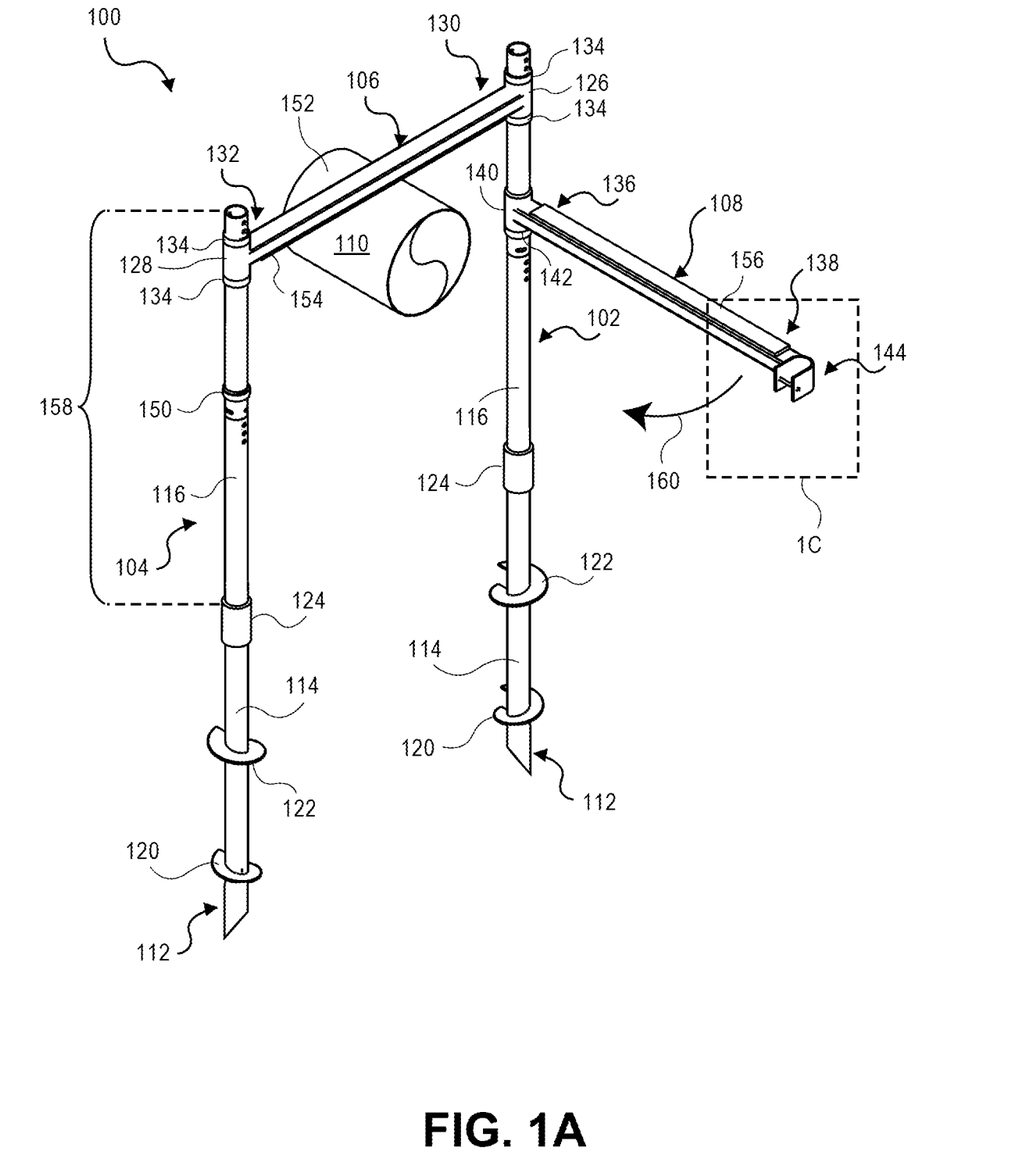
FIG. 1A illustrates a perspective view of an underwater anchoring assembly in an unactuated or open state, according to an embodiment.
Figure 1B:
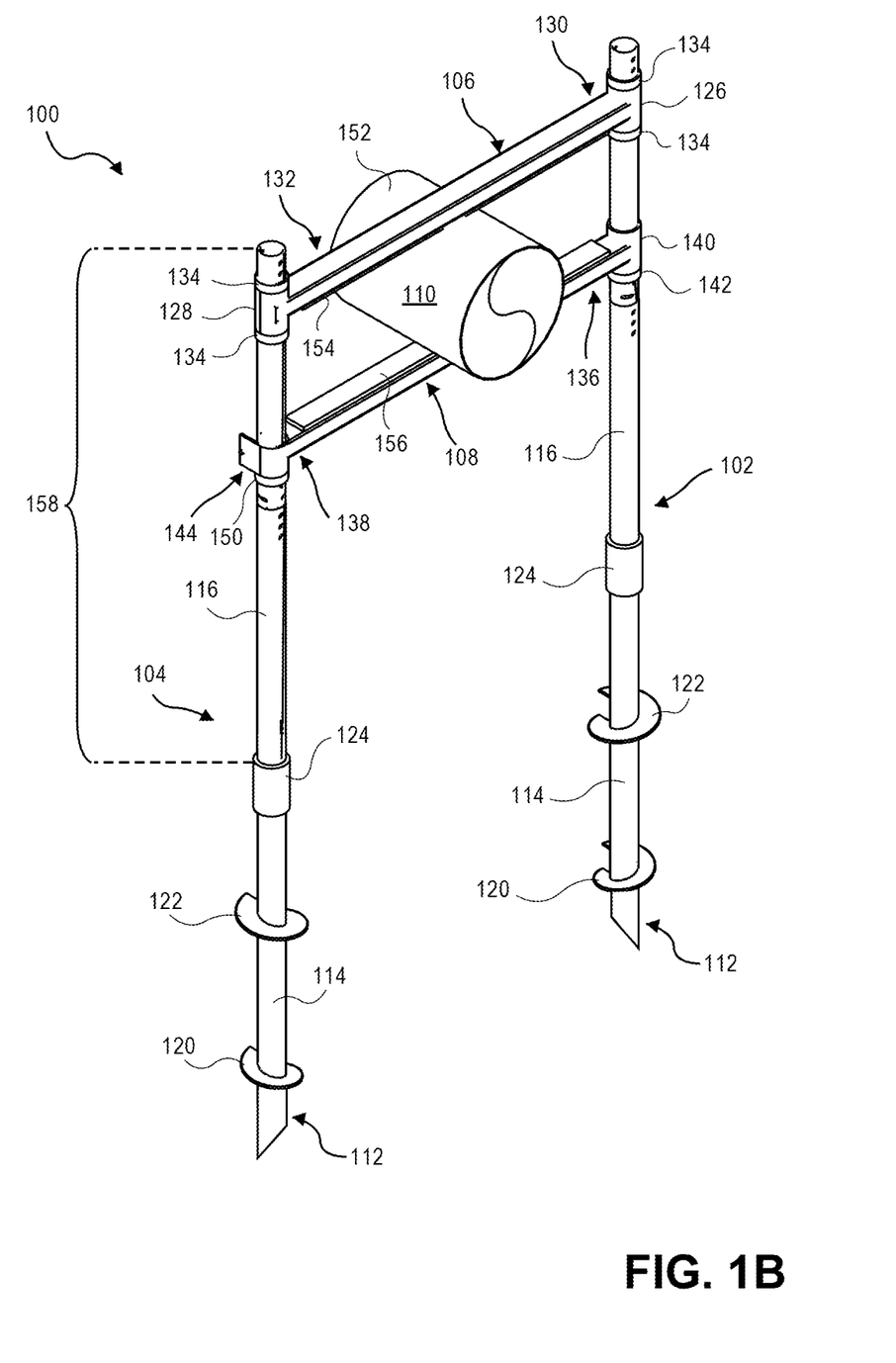
FIG. 1B illustrates a perspective view of an underwater anchoring assembly in an actuated or closed state, according to an embodiment.

FIG. 1A illustrates a perspective view of an underwater anchoring assembly 100 in an unactuated or open state, according to an embodiment. FIG. 1B illustrates a perspective view of the underwater anchoring assembly 100 in an actuated or closed state, according to an embodiment. The anchoring assembly 100 may include one or more piles (two are shown: 102, 104) and one or more supports, which may each include one or more cross-members. In the illustrated embodiment, two pipe supports are provided, one at least partially by a first cross-member 106, and the second at least partially by a second cross-member 108. The cross-members 106, 108 coupled with one or more of the piles 102, 104, e.g., such that the piles 102, 104 are rotatable with respect thereto, as will be described in greater detail below. Moreover, when assembled and installed, the anchoring assembly 100 may be capable of or configured to at least partially support a pipeline or a pipe 110 thereof (e.g., underwater pipeline or pipe) above a ground or terranean surface (e.g., the sea floor).

Each of the piles 102, 104 may be capable of or configured to be advanced into the ground by a downward force, a rotational force, or a combination thereof. It should be appreciated that each of the piles 102, 104 disclosed herein may include similar features, components, and/or parts. As such, discussions herein regarding a first pile 102 are equally applicable to a second pile 104. As illustrated in FIG. 1A, each of the piles 102, 104 may include a nose 112 and a lead 114 (e.g., a tubular member). Each of the piles 102, 104 may further include an optional lateral support device (not shown), and/or an optional extension 116 (e.g., an additional tubular member). It should be appreciated that the lead 114 and any optional extensions 116 of each of the piles 102, 104 may have any suitable cross-sectional shape. Illustrative cross-sectional shapes of the lead 114 and/or the optional extension 116 may include circular, polygonal, or the like.

The respective nose 112 of each of the piles 102, 104 may be configured to reduce the resistance and guide the respective piles 102, 104 as the piles 102, 104 are pressed or rotated downward into the ground. For example, the respective nose 112 of each of the piles 102, 104 may be shaped to reduce resistance and guide the piles 102, 104 into the ground. As illustrated in FIGS. 1A and 1B, the respective nose 112 of each of the piles 102, 104 may be angled or cut to provide an angled lower end that reduces resistance and guides the respective piles 102, 104 into the ground. In another embodiment, the nose 112 may include a tapered surface. For example, the nose 112 may be conical or frustoconical.

As illustrated in FIGS. 1A and 1B, each of the piles 102, 104 may include one or more helices (two are shown 120, 122 for each of the piles 102, 104) capable of or configured to facilitate or aid in the advancement of the respective piles 102, 104 into the ground. For example, as illustrated in FIG. 1A, the first pile 102 may include first and second helices 120, 122 disposed about and fixedly coupled with the lead 114. In at least one embodiment, respective outer diameters of each of the helices 120, 122 may increase along a length of the respective piles 102, 104 from the nose 112 toward the optional extension 116. It should be appreciated that while two helices 120, 122 are illustrated in FIGS. 1A and 1B, any number of helices 120, 122 may be disposed about any portion of each of the piles 102, 104 without departing from the principles of the present disclosure. In some embodiments, however, the piles 102, 104 or portions thereof may not include any helices 120, 122. For example, each of the piles 102, 104 may not include any helices on the respective noses 112, and may only include helices on the respective leads 114 thereof. In another example, each of the piles 102, 104 may not include any helices on the respective leads 114, and may only include helices on the respective noses 112 thereof.

In at least one embodiment, illustrated in FIG. 1A, each of the piles 102, 104 may include the optional extension 116 coupled with the lead 114. The optional extension 116 may be coupled with the lead 114 via any suitable manner, including, but not limited to, welding, epoxy, one or more connection members, or the like, or any combination thereof. For example, as illustrated in FIG. 1A, each of the extensions 116 may be coupled with the respective lead 114 via a connection member 124. Illustrative connection members 124 may be or include, but are not limited to, sleeves, bolts, nuts, other suitable mechanical fasteners, or the like, or combinations thereof. In another embodiment, any one or more of the piles 102, 104 may not include the optional extensions 116. For example, the respective lead 114 of each of the piles 102, 104 may be a single, continuous tubular member appropriately sized for the anchoring assembly 100 and/or the pipe 110. It should be appreciated that the extensions 116 may be capable of or configured to allow for a height adjustment of the underwater anchoring assembly 100 or an upper portion 158 thereof to accommodate a height of the pipe 110 relative to the ground or terranean surface (e.g., the sea floor).

In at least one embodiment, one or more of the piles 102, 104 of the underwater anchoring assembly 100 may be the same or similar to one or more embodiments of the helical pile assembly discussed and described in U.S. Patent Publication No. 2016/018642, which is incorporated herein by referenced in its entirety, to the extent not inconsistent with the present disclosure.

As illustrated in FIG. 1A, the cross-members 106, 108 may be operably coupled with one or more of the piles 102, 104. Each of the one or more cross-members 106, 108 may, separately or individually, be coupled with any one or more of the piles 102, 104, such that the piles 102, 104 are able to rotate with respect to the cross-members 106, 108 (i.e., "rotatably" coupled). This may permit the piles 102, 104 to be drilled or advanced into the ground (e.g., sea floor) while the cross-members 106, 108 are attached thereto. In other embodiments, the cross-members 106, 108 may be fixed to the piles 102, 104, such that the piles 102, 104 are immovable with respect to the cross-members 106, 108. In such an embodiment, for example, the piles 102, 104 may be capable of and configured to be driven axially into the ground without rotation.

The first cross-member 106 may be coupled with the first and second piles 102, 104 by any suitable means. For example, the first cross-member 106 may include first and second annular sleeves 126, 128 disposed at and coupled with first and second end portions 130, 132 of the first cross-member 106, respectively. Each of the annular sleeves 126, 128 may be suitably sized and shaped to be disposed about an outer surface or diameter of each of the respective piles 102, 104.

In at least one embodiment, each of the annular sleeves 126, 128 may be coupled with the respective piles 102, 104 such that the piles 102, 104 and the annular sleeves 126, 128 may not be able to rotate or move relative to one another. For example, each of the annular sleeves 126, 128 may be coupled with the respective piles 102, 104 via an interference or friction fit, one or more welds (e.g., tack welds), one or more mechanical fasteners, or the like, or any combination thereof.

In another embodiment, each of the annular sleeves 126, 128 may be coupled with the respective piles 102, 104 such that the piles 102, 104 and the annular sleeves 126, 128 may be able to be rotated or moved relative to one another. For example, as illustrated in FIG. 1A, the annular sleeves 126, 128 may be coupled with the respective piles 102, 104 via one or more restraints, collars, or retainers 134. Each of the retainers 134 may be disposed adjacent to the respective annular sleeve 126, 128 and coupled with the respective piles 102, 104. Each of the retainers 134 may be capable of or configured to position the annular sleeves 126, 128 of the first cross-member 106 along the respective lengths of each of the piles 102, 104. Each of the retainers 134 may also be capable of or configured to restrain or prevent the axial movement of the annular sleeves 126, 128 of the first cross-member 106 along the respective lengths of each of the piles 102, 104, while allowing each of the piles 102, 104 and the respective annular sleeves 126, 128 to freely rotate with respect to one another. For example, as illustrated in FIG. 1A, the retainers 134 may be disposed directly above and below the respective annular sleeves 126, 128 of the first cross-member 106 and coupled with the respective piles 102, 104 to prevent the movement (e.g., axial) of the first cross-member 106 along the piles 102, 104, and allow the free rotation of the respective piles 102, 104 within the annular sleeves 126, 128. It should be appreciated that each of the retainer 134 may be coupled with the respective piles 102, 104 via any suitable means, including, but not limited to, one or more welds (e.g., tack welds), a friction or interference fit, one or more mechanical fasteners (e.g., bolts, studs, nuts, etc.), or the like, or any combination thereof.

The second cross-member 108 may be rotatably coupled with the first pile 102 and detachably coupled with the second pile 104. For example, as illustrated in FIGS. 1A and 1B, a first end portion 136 of the second cross-member 108 may be rotatably coupled with the first pile 102 and a second end portion 138 of the second cross-member 108 may be detachably coupled with the second pile 104 via fasteners or fastening mechanisms. As used herein, the term "detachably coupled" refers to connecting together two components such that the two components can be disconnected without damaging the components, e.g., by yielding one or more of the components. Such detachable coupling can be accomplished using a fastening mechanism, for example, attaching a fastener (e.g., clip, pin, etc.) between the components. As described herein, the second end portion 138 of the second cross-member 108 may be coupled to the second pile 104 by attaching a fastener or engaging a fastening mechanism, and decoupled to the second pile 104 by removing the fastener or disengaging the fastening mechanism.

The second cross-member 108 may be rotatably coupled with the first pile 102 in any suitable manner. In at least one embodiment, the second cross-member 108 may include an annular sleeve 140 disposed at and coupled with the first end portion 136 thereof. The annular sleeve 140 may be suitably sized and shaped to be disposed about the outer surface or diameter of the first pile 102. As illustrated in FIG. 1A, the annular sleeve 140 of the second cross-member 108 may be positioned along the first pile 102 via one or more retainers (one is shown 142). The retainer 142 may be disposed adjacent to the annular sleeve 140 and coupled with the first pile 102. The retainers 142 may be coupled with the first pile 102 via any suitable means, including, but not limited to, one or more welds (e.g., tack welds), a friction or interference fit, one or more mechanical fasteners (e.g., bolts, studs, nuts, etc.), or the like, or any combination thereof. The retainer 142 may be capable of or configured to position the second cross-member 108 along the length the first pile 102. The retainer 142 may also be capable of or configured to restrain or prevent the movement of the annular sleeve 140 of the second cross-member 108 along the length the first pile 102 while allowing the annular sleeve 140 to freely rotate about the first pile 102. For example, as illustrated in FIG. 1A, the retainer 142 may be disposed below (e.g., directly below) the annular sleeve 140 of the second cross-member 108 and coupled with the first pile 102 to prevent the second cross-member 108 from moving downward along the first pile 102 toward the lead 114 of the first pile 102.

In at least one embodiment, a retainer (not shown) may be disposed above (e.g., directly above) the annular sleeve 140 of the second cross-member 108 and coupled with the first pile 102 to prevent the second cross-member 108 from moving upward away from the lead 114 of the first pile 102. In another embodiment, illustrated in FIGS. 1A and 1B, no retainer is disposed above the annular sleeve 140 of the second cross-member 108. For example, the movement of the second cross-member 108 upward may be limited or prevented by the pipe 110 disposed between the first and second cross-members 106, 108. It should be appreciated that the retainer or retainers 142 may be disposed above and/or below the annular sleeve 140 in a manner that allow for the free rotation of the annular sleeve 140 of the second cross-member 108 about the first pile 102.

The second cross-member 108 may be detachably coupled with the second pile 104 in any suitable manner. In at least one embodiment, the second cross-member 108 may include a semi-annular, curved, arcuate, or otherwise U-shaped sleeve 144 disposed at and coupled with the second end portion 138 thereof. The U-shaped sleeve 144 may be suitably sized and shaped to be disposed about at least a portion of the outer surface or diameter of the second pile 104. The U-shaped sleeve 144 may be capable of or configured to detachably couple the second end portion 138 of the second cross-member 108 with the second pile 104.

Figure 1C:
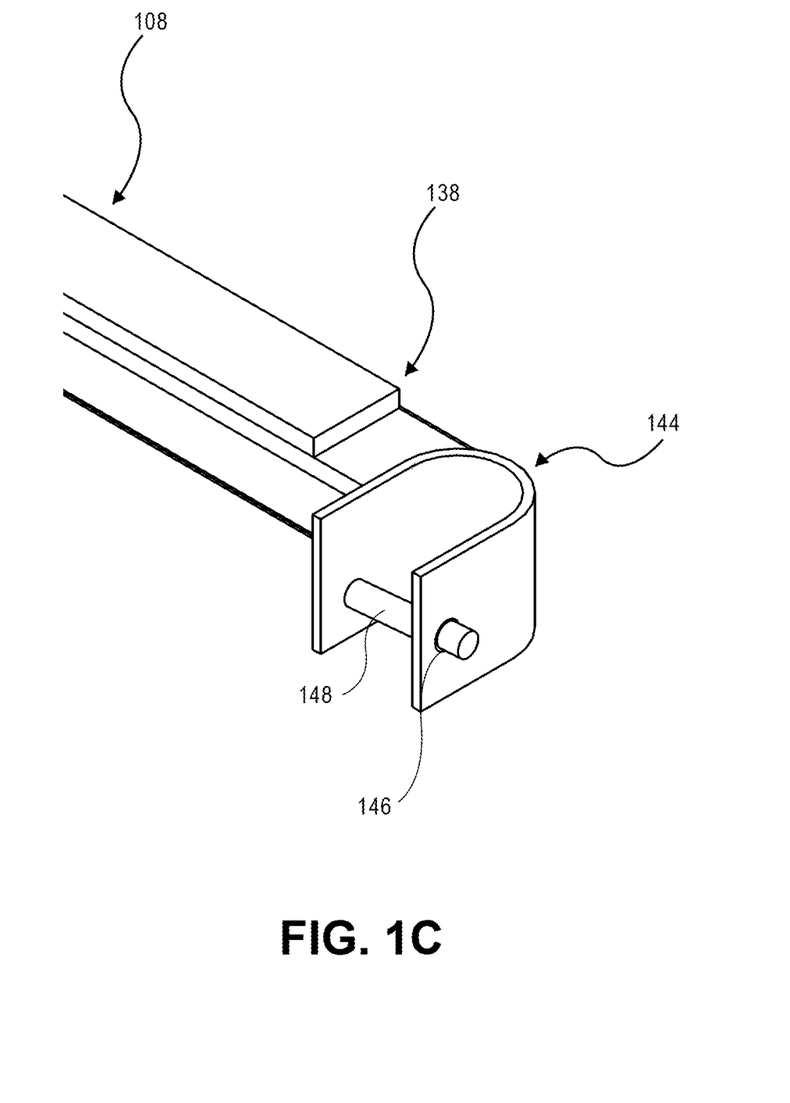
FIG. 1C illustrates an enlarged view of the underwater anchoring assembly, indicated by the box labeled "1C" of FIG. 1A, according to an embodiment.

In at least one embodiment, the second cross-member 108 may include one or more fasteners or fastening mechanisms capable of or configured to detachably couple the second end portion 138 of the second cross-member 108 with the second pile 104. For example, as illustrated in FIG. 1C, the U-shaped sleeve 144 may define a through-hole 146 extending therethrough and configured to receive a latch pin 148 to detachably couple the second cross-member 108 with the second pile 104. In at least one embodiment, the latch pin 148 may extend through the second pile 104 to couple the second cross-member 108 with the second pile 104. For example, the second pile 104 may define a hole (not shown) extending therethrough and configured to receive the latch pin 148. In another embodiment, the latch pin 148 may not extend through the second pile 104 to couple the second cross-member 108 with the second pile 104. For example, the latch pin 148 may extend only through the U-shaped sleeve 144 to confine the second pile 104 within the U-shaped sleeve 144.

While FIG. 1C illustrates the fasteners or fastening mechanisms as a combination of the through-hole 146 and the latch pin 148, it should be appreciated that other suitable fasteners or fastening mechanisms are contemplated. Illustrative fasteners or fastening mechanisms may be or include, but are not limited to, one or more bolts, slides, screws, pivot pins, clips, or the like, or any combination thereof.

As illustrated in FIG. 1B, one or more retainers (one is shown 150) may be disposed adjacent the U-shaped sleeve 144 of the second cross-member 108. The retainer 150 may be similar to the retainers 134, 142 discussed above. For example, the retainer 150 may be disposed adjacent to (e.g., directly above and/or below) the U-shaped sleeve 144 of the second cross-member 108 and coupled with the second pile 104, and capable of or configured to position the U-shaped sleeve 144 of the second cross-member 108 along the length of the second pile 104. The retainer 150 may also be capable of or configured to prevent the movement of the U-shaped sleeve 144 of the second cross-member 108 along the length the second pile 104. For example, as illustrated in FIG. 1A, the retainer 150 may be disposed below (e.g., directly below) the U-shaped sleeve 144 and coupled with the second pile 104 to prevent the U-shaped sleeve 144 of the second cross-member 108 from moving downward along the second pile 104 toward the lead 114 thereof.

In at least one embodiment, a retainer (not shown) may be disposed above (e.g., directly above) the U-shaped sleeve 144 of the second cross-member 108 and coupled with the second pile 104 to prevent the second cross-member 108 from moving upward away from the lead 114 of the second pile 104. In another embodiment, illustrated in FIGS. 1A and 1B, no retainer is disposed above the U-shaped sleeve 144 of the second cross-member 108. For example, the movement of the second cross-member 108 upward may be limited or prevented by the pipe 110 disposed between the first and second cross-members 106, 108.

In at least one embodiment, any one or more of the cross-members 106, 108 may be shaped and/or sized to receive at least a portion of the pipe 110. For example, any one or more of the cross-members 106, 108 may be curved or arcuate along a portion (e.g., length) thereof such that the curved portion may mate, engage, or otherwise interface with an outer diameter or outer surface 152 of the pipe 110. In another embodiment, any one or more of the cross-members 106, 108 may be straight along respective lengths thereof. For example, as illustrated in FIG. 1A, the first cross-member 106 and the second cross-member 108 may be straight along the respective lengths thereof.

The underwater anchoring assembly 100 and the components thereof may be fabricated from any suitable material. For example, the underwater anchoring assembly 100 and the components thereof may be fabricated from materials capable of or configured to withstand underwater (e.g., fresh and seawater) conditions. In another example, the underwater anchoring assembly 100 and the components thereof may be fabricated from materials capable of or configured to sufficiently support the pipeline or the pipes 110 thereof. Illustrative materials from which the underwater anchoring assembly 100 and the components thereof may be fabricated from include, but are not limited to, one or more metals and/or alloys, such as stainless steel, carbon steel, titanium, a titanium alloy, nickel, a nickel alloy, hardened steel, or the like, or any combination thereof.

In at least one embodiment, at least a portion of the underwater anchoring assembly 100 may be fabricated from or include one or more low-friction materials capable of or configured to prevent erosion or wear of one or more interfacing surfaces of the underwater anchoring assembly 100. The low-friction materials may also be capable of or configured to allow the pipe 110 to move laterally (e.g., side-by-side or longitudinally) relative to the underwater anchoring assembly 100. For example, a portion of the underwater anchoring assembly 100 or a component thereof may be fabricated from, lined, or otherwise coated with a low-friction material to prevent excessive erosion or wearing of the underwater anchoring assembly 100 or the component thereof. In at least one embodiment, the low-friction material may be interposed between the pipe 110 and the first and/or second cross-members 106, 108 of the anchoring assembly 100. For example, as illustrated in FIG. 1A, a first layer 154 of the low-friction material may be interposed between the outer surface 152 of the pipe 110 and an interfacing or bottom surface of the first cross-member 106. As further illustrated in FIG. 1A, a second layer 156 of the low-friction material may be interposed between the outer surface 152 of the pipe 110 and an interfacing or upper surface of the second cross-member 108. While FIGS. 1A and 1B illustrate the first and second layers 154, 156 of the low-friction material being coupled with the first and second cross-members 106, 108, respectively, it should be appreciated that one or more layers or coatings (not shown) of the low-friction material may additionally or alternatively be coupled with the outer surface 152 of the pipe 110 to prevent erosion or wearing with the first and second cross-members 106, 108.

The low-friction material may be or include any suitable material capable of reducing friction between the underwater anchoring assembly 100 and the pipe 110. Illustrative low-friction materials may include, but are not limited to, one or more polymers, such as polyolefin-based polymers, acryl-based polymers, polyurethane-based polymers, ether-based polymers, polyester-based polymers, polyamide-based polymers, formaldehyde-based polymers, silicon-based polymers, poly(ether ether ketone) (PEEK), TORLON®, TEFLON®, polytetrafluoroethylene (PTFE), polychlorotrifluoroethylene (PCTFE), or the like, or any combination or copolymers thereof.

In operation of the underwater anchoring assembly 100, with continued referenced to FIGS. 1A-1C, the piles 102, 103 and first and second cross-members 106, 108 may be coupled with one another and advanced into the ground as a single unit (e.g., in an unactuated state). For example, the underwater anchoring assembly 100 may be assembled such that the respective leads 114 and extensions 116 of each of the piles 102, 104 are coupled with one another via the respective connection members 124, the first cross-member 106 is coupled with the first and second piles 102, 104 via the first and second annular sleeves 126, 128 thereof, and the second cross-member 108 is coupled with the first pile 102 as illustrated in FIG. 1A (e.g., unactuated state). The underwater anchoring assembly 100, maintained in the unactuated state (illustrated in FIG. 1A), may then be advanced into the ground. As the underwater anchoring assembly 100 is advanced into the ground, each of the first and second piles 102, 104 may freely rotate within the respective annular sleeves 126, 128, 140 of the first and second cross-members 106, 108. As illustrated in FIG. 1A, in the unactuated or open state, the second end portion 138 of the second cross-member 108 may be detached from the second pile 104, thereby allowing the pipe 110 to receive or be disposed adjacent to the first cross-member 106 from above such that the first cross-member 106 extends across the top of the pipe 110. The underwater anchoring assembly 100 may be advanced into the ground until the first cross-member 106 is disposed adjacent to or engages the top of the pipe 110. After the first cross-member 106 is disposed adjacent to or engages the pipe 110, the underwater anchoring assembly 100 may be actuated to a closed state (as illustrated in FIG. 1B) via a diver and/or a remotely operated vehicle (ROV). For example, the second cross-member 108 may be rotated or pivoted about the annular sleeve 140 in a direction indicated by arrow 160 to thereby actuate the underwater anchoring assembly 100 to the closed state (FIG. 1B). As discussed above, the latch pin 148 may be disposed through the through-hole 146 of the U-shaped sleeve 144 to detachably couple the second end portion 138 of the second cross-member 108 with the second pile 104, and thereby maintain the underwater anchoring assembly 100 in the closed state. It should be appreciated that the underwater anchoring assembly 100 or one or more components thereof may be fabricated from a relatively rigid material. For example, the cross-members 106, 108 may be fabricated from a sufficiently rigid material such that any vertical force may be readily transferred to the first and second piles 102, 104 without deformation or substantial deformation of the cross-members 106, 108.

In another operation of the underwater anchoring assembly 100, with continued reference to FIGS. 1A-1C, each of the first and second piles 102, 104 may first be advanced into the ground via a downward force, a rotational force, or a combination thereof. In at least one embodiment, the respective leads 114 and optional extensions 116 of each of the first and second piles 102, 104 may be advanced into the ground as a single unit. For example, the respective lead 114 and optional extensions 116 may be coupled with one another (e.g., via the connection member 124), and subsequently advanced into the ground as a single unit. In another embodiment, the respective leads 114 may be advanced into the ground, and the respective extensions 116 may be subsequently coupled with the respective leads 114. As the first and second piles 102, 104 are advanced into the ground, the respective noses 112 thereof may reduce the resistance and guide the first and second piles 102, 104 into the ground. The first and second piles 102, 104 may be advanced into the ground until a predetermined depth is reached and/or until a predetermined torque value is reached. If necessary, additional extensions (not shown) may be coupled with the respective extensions 116 of each of the piles 102, 104 if additional length is needed or desired.

In another embodiment, the respective leads 114 are advanced into the ground, and the extensions 116 are subsequently coupled with the respective leads 114 after the leads 114 are secured in the ground. In at least one embodiment, the first and/or second cross-members 106, 108 may be coupled with the respective extensions 116 of each of the piles 102, 104 after coupling the extensions 116 with the respective leads 114. In another embodiment, the first and/or second cross-members 106, 108 may be coupled with the respective extensions 116 of each of the piles 102, 104 before coupling the extensions 116 with the respective leads 114. For example, the upper portion 158 of the underwater anchoring assembly 100 including the first cross-member 106, the second cross-member 108, and the extensions 116, may be operably coupled with one another, and subsequently coupled with the respective leads 114 of the first and second piles 102, 104.

The upper portion 158 of the underwater anchoring assembly 100 may be maintained in an unactuated or open state (illustrated in FIG. 1A) prior to coupling the upper portion 158 with the respective leads 114 of the first and second piles 102, 104. After the upper portion 158 is positioned such that the first cross-member 106 is disposed adjacent to or engages the pipe 110, and the extensions 116 are coupled with the respective leads 114 of the first and second piles 102, 104, the underwater anchoring assembly 100 or the upper portion 158 thereof may be actuated to a closed state (as illustrated in FIG. 1B) as discussed above.

To remove or uninstall the underwater anchoring assembly 100, the upper portion 158 may be actuated from the closed state (as illustrated in FIG. 1B) to the open state (as illustrated in FIG. 1A). For example, the latch pin 148 may be removed from the through-hole 146 of the U-shaped sleeve 144, thereby decoupling the second end portion 138 of the second cross-member 108 from with second pile 104. The second cross-member 108 may then be rotated about the first end portion 136 thereof to actuate the underwater anchoring assembly 100 to the opened state. Subsequently, the underwater anchoring assembly 100 may be removed or lifted from the sea floor.

Figure 2A:
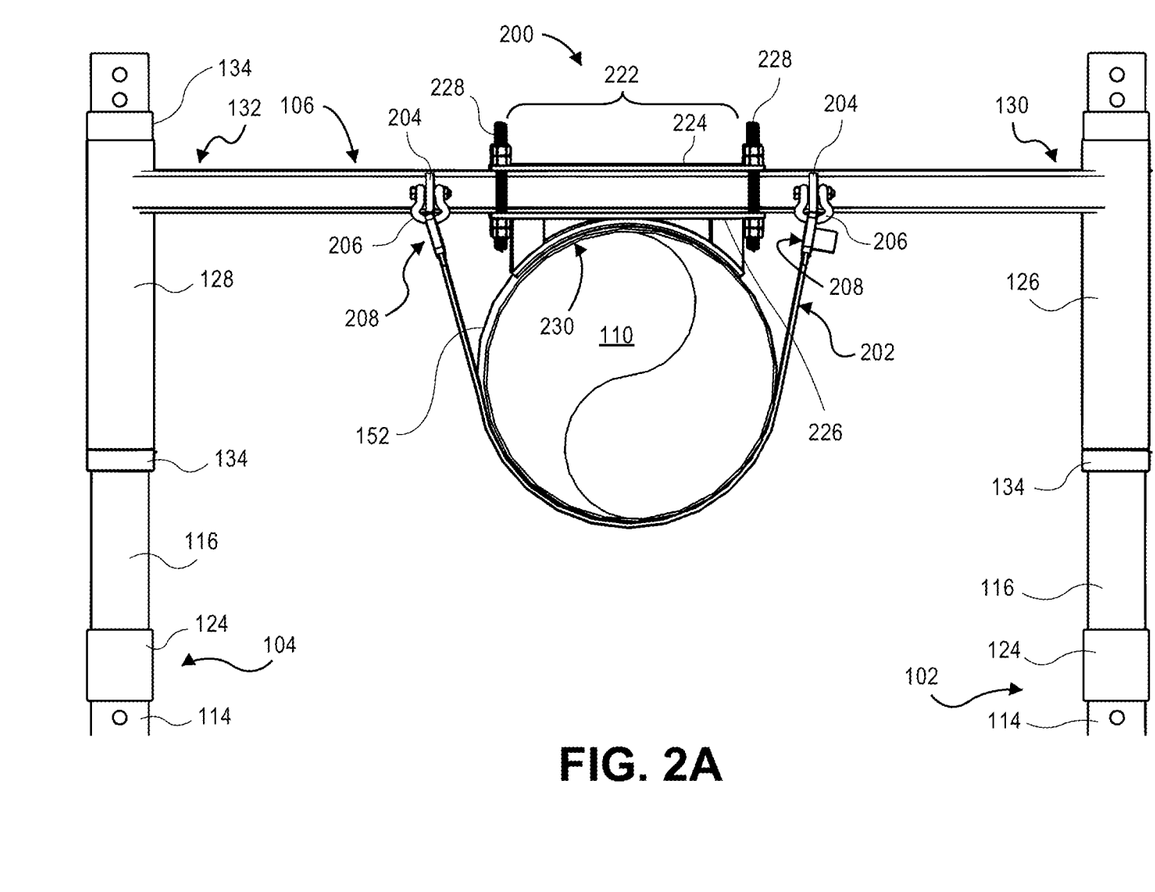
FIG. 2A illustrates a front view of another underwater anchoring assembly, according to an embodiment.
Figure 2B:
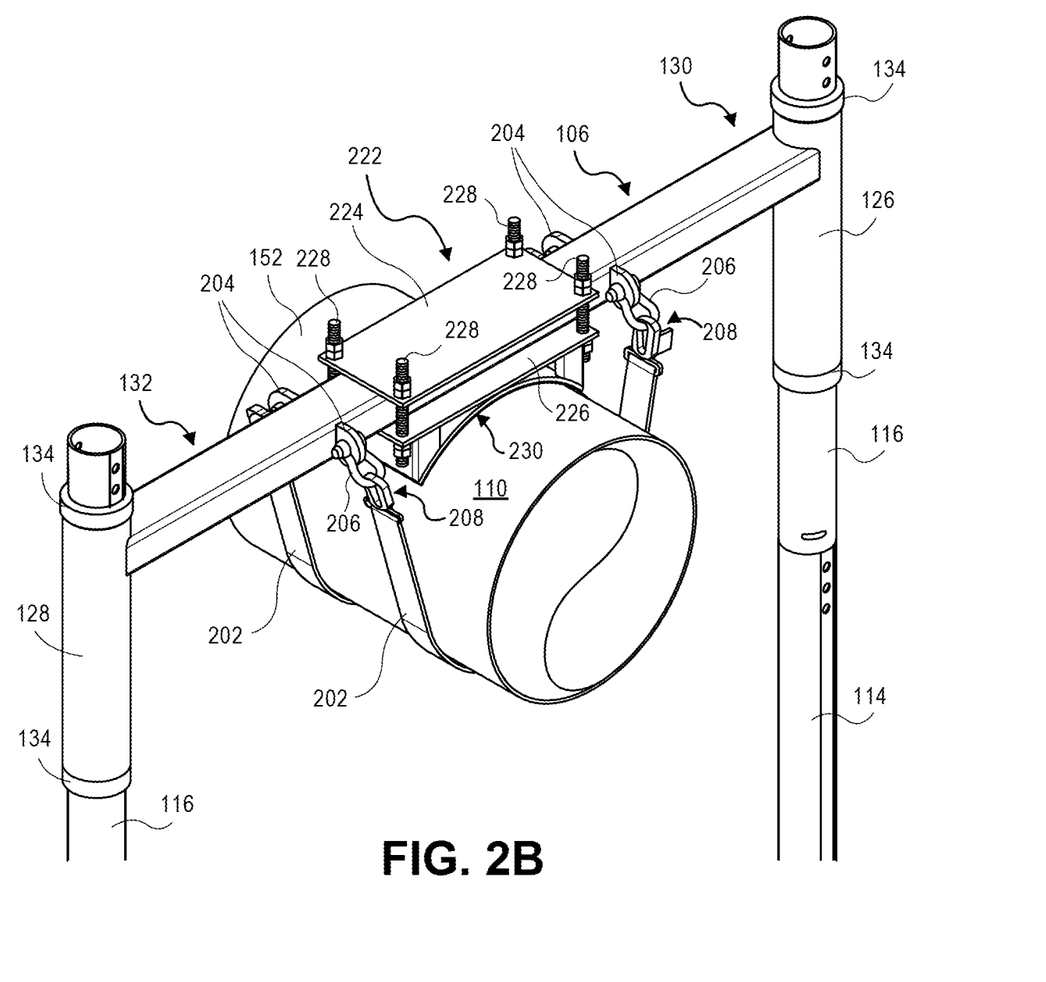
FIG. 2B illustrates a perspective view of the underwater anchoring assembly of FIG. 2A, according to an embodiment.

FIG. 2A illustrates a front view of another underwater anchoring assembly 200, according to an embodiment. FIG. 2B illustrates a perspective view of the underwater anchoring assembly 200 of FIG. 2A, according to an embodiment. The anchoring assembly 200 illustrated in FIGS. 2A and 2B may be similar in some respects to the anchoring assembly 100 described above, and therefore, may be best understood with reference to the description of FIGS. 1A-1C, where like numerals designate like components and will not be described again in detail.

As illustrated in FIGS. 2A and 2B, the underwater anchoring assembly 200 may include the first cross-member 106 (e.g., as part of a first support) coupled with the first and second piles 102, 104. As further illustrated in FIGS. 2A and 2B, the underwater anchoring assembly 200 may not include the second cross-member 108. Instead, the underwater anchoring assembly 200 may include one or more ropes or straps (two are shown: 202) capable of or configured to affix, secure, support, or otherwise couple the pipe 110 with the first cross-member 106. The straps 202 may thus serve as part of the second support in this embodiment.

The one or more straps 202 may be detachably coupled with the first cross-member 106 via any suitable manner. In at least one embodiment, illustrated in FIG. 2B the first cross-member 106 may include one or more pad eyes (four are shown 204) having a respective shackle or a gyve 206 coupled therewith. Each of the shackles 206 may be capable of or configured to mate or couple with a coupling member, e.g., a carabiner 208, coupled with respective ends of each of the straps 202.

Figure 2C:
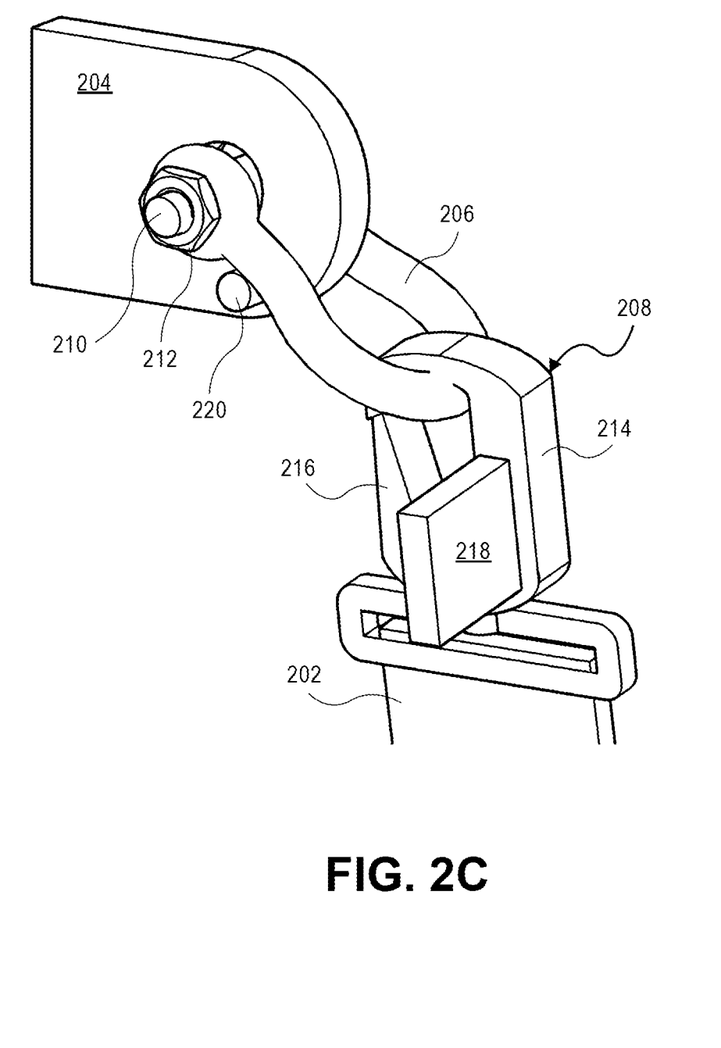
FIG. 2C illustrates an enlarged view of a pad eye and shackle coupled with a carabiner of a strap, according to an embodiment.

FIG. 2C illustrates an enlarged view of the pad eye 204 and the shackle 206 coupled with the carabiner 208 of the strap 202, according to an embodiment. As illustrated in FIG. 2C, the shackle 206 may be coupled with the pad eye 204 via one or more mechanical fasteners, illustrated as a bolt 210 and a nut 212. It should be appreciated that other mechanical fasteners, such as pins (e.g., clevis pins, studs, etc.) are also contemplated herein.

As illustrated in FIG. 2C, the carabiner 208 may include a hook or loop 214 and a spring-loaded latch or gate 216 coupled with the loop 214. The spring-loaded gate 216 may be capable of or configured to couple the carabiner 208 with the shackle 206 or decouple the carabiner 208 from the shackle 206. It should be appreciated that one or more parameters or features of the carabiner 208 may vary widely, and may be at least partially determined by one or more parameters or features of the shackle 206, the pad eye 204, and/or the first cross-member 106. For example, the carabiner 208 may be sized and/or shaped such that the carabiner 208 may sufficiently or securely couple the strap 202 with the first cross-member 106 via the shackle 206. Illustrative shapes of the carabiner 208 may include D-shaped, pear-shaped, or the like. In at least one embodiment, the spring-loaded gate 216 of the carabiner 208 may include a locking mechanism. For example, the spring-loaded gate 216 of the carabiner 208 may include an auto-locking mechanism or a manual locking mechanism.

In at least one embodiment, the carabiner 208 may include one or more tabs or planar extensions (one is shown 218) capable of or configured to allow the carabiner 208 to be more readily or easily operated by a user (e.g., diver) and/or a remotely operated vehicle (ROV). For example, as illustrated in FIG. 2C, the tab 218 may be coupled with the hook 214 of the carabiner 208. In another example, a tab (not shown) may be coupled with the spring-loaded gate 216 of the carabiner 208. In yet another example, a first tab (not shown) may be coupled with the spring-loaded gate 216 and a second tab (not shown) may be coupled with the hook 214 of the carabiner 208. It should be appreciated that the tab 218 may extend or protrude from the carabiner 208 in a direction perpendicular to the direction in which the spring-loaded gate 216 may be actuated. The tab 218 may thus provide a structure that is easily gripped by a mechanism, such a gripping mechanism provided by an arm of an ROV, with two fingers that move together in a pinching motion.

In at least one embodiment, each of the pad eyes 204 may include a rotational stop (e.g., positive rotational stop) 220 capable of or configured to position and/or prevent over rotation of the shackle 206 about the respective pad eyes 204. For example, as illustrated in FIG. 2C, the rotational stop 220, illustrated as a stud or protrusion, may extend or protrude from the pad eye 204 in a direction perpendicular to a rotational direction of the shackle 206 to thereby position and/or prevent the over rotation of the shackle 206.

The straps 202 may be fabricated from any suitable material capable of or configured to sufficiently couple or secure the pipe 110 to the first cross-member 106. Illustrative materials for the straps 202 may be or include, but are not limited to, one or more polymers, rubbers, metals (e.g., single element and/or alloy), or the like, or any combination thereof. The straps 202 may be braided or unbraided. The straps 202 may be fabricated with a single layer or multiple layers. In at least one embodiment, the straps 202 may be coated with an abrasion resistant material to prevent excessive erosion or wearing of the pipe 110.

Referring back to FIGS. 2A and 2B, the underwater anchoring assembly 200 may include a pipe brace 222 capable of or configured to engage or interface with the outer surface 152 of the pipe 110 to thereby secure the pipe 110 to the first cross-member 106. The pipe brace 222 may include an upper plate 224 and a lower plate 226. As illustrated in FIGS. 2A and 2B, the upper and lower plates 224, 226 of the pipe brace 222 may be disposed about the first cross-member 106 such that the first cross-member 106 is interposed therebetween. The pipe brace 222 may be secured or coupled with the first cross-member 106 by fastening or coupling the upper and lower plates 224, 226 with one another while the first cross-member 106 is interposed therebetween. As illustrated in FIG. 2B, the upper and lower plates 224, 226 may be coupled with one another via one or more mechanical fasteners (four are shown 228).

In at least one embodiment, the pipe brace 222 may include an arcuate contact member 230 integrally formed or coupled with the lower plate 226 thereof. As illustrated in FIGS. 2A and 2B, the arcuate contact member 230 may have a radius of curvature substantially equal to a radius of curvature of the outer surface 152 of the pipe 110. The arcuate contact member 230 may engage or interface with the outer surface 152 of the pipe 110 to prevent the lateral movement of the pipe 110 along the first cross-member 106. In at least one embodiment, the pipe brace 222 or a components thereof may be integrally formed with the first cross-member 106. For example, any one or more of the upper plate 224, the lower plate 226, the arcuate contact member 230, or any combination thereof may be integrally formed with the first cross-member 106. For example, the arcuate contact member 230 may be integrally formed with the first cross-member 106.

In at least one embodiment, at least a portion of the underwater anchoring assembly 200 may be fabricated from or include one or more low-friction materials capable of or configured to prevent erosion or wear of one or more interfacing surfaces of the underwater anchoring assembly 200. The low-friction materials may also be capable of or configured to allow the pipe 110 to move laterally (e.g., side-by-side or longitudinally) relative to the underwater anchoring assembly 200. For example, a portion of the underwater anchoring assembly 200 or a component thereof may be fabricated from, lined, or otherwise coated with a low-friction material to prevent excessive erosion or wearing of the underwater anchoring assembly 200 or the component thereof. In at least one embodiment, the low-friction material may be interposed between the pipe 110 and the first cross-member 106. For example, the low-friction material may be interposed between the outer surface 152 of the pipe 110 and an interfacing or bottom surface of the first cross-member 106 or the arcuate contact member 230 thereof. The low-friction materials may be or include any one or more of the low-friction materials discussed above with respect to FIGS. 1A-1C.

In operation of the underwater anchoring assembly 200, with continued reference to FIGS. 2A-2C, the underwater anchoring assembly 200 may be advanced into the ground via a downward force, a rotational force, or a combination thereof. The underwater anchoring assembly 200 may be advanced into the ground as a single unit. For example, the underwater anchoring assembly 200 may be assembled such that the respective leads 114 and extensions 116 of each of the piles 102, 104 are coupled with one another via the respective connection members 124, and the first cross-member 106 is coupled with the first and second piles 102, 104 via the first and second annular sleeves 126, 128 thereof. If needed, the pipe brace 222 may be coupled with the first cross-member 106 before or after securing the first cross-member 106 to the first and second piles 102, 104. The underwater anchoring assembly 200 may then be advanced into the ground. As the underwater anchoring assembly 200 is advanced into the ground, each of the first and second piles 102, 104 may freely rotate within the respective annular sleeves 126, 128 of the first cross-member 106. The underwater anchoring assembly 200 may be advanced into the ground until the first cross-member 106 or the pipe brace 222 thereof is disposed adjacent to or engages the outer surface 152 of the pipe 110.

After the pipe brace 222 is positioned adjacent to the pipe 110, each of the straps 202 may be wrapped or disposed about the outer surface 152 of the pipe 110 and coupled with the first cross-member 106. For example, the straps 202 may be disposed about the outer surface of the pipe 110 and the respective carabiners 208 of each of the straps 202 may couple the to the first cross-member 106 via the respective shackles 206 thereof.

To remove or uninstall the underwater anchoring assembly 200, the straps 202 may be decoupled from the first cross-member 106 by decoupling the respective carabiners 208 of each of the straps 202 from the shackles 206. After decoupling the straps 202 from the first cross-member 106, the underwater anchoring assembly 200 may be removed or lifted from the sea floor.

Figure 3:
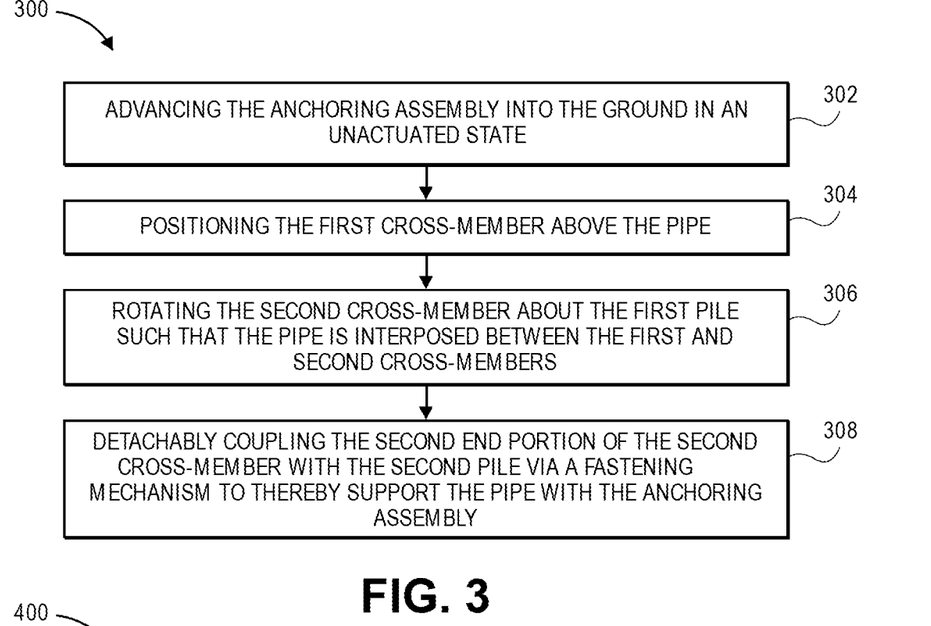
FIG. 3 illustrates a flowchart of a method for supporting a pipe with an underwater anchoring assembly, according to an embodiment.

FIG. 3 illustrates a flowchart of a method 300 for supporting a pipe with an underwater anchoring assembly, according to an embodiment. The method 300 may be employed using one or more embodiments of the underwater anchoring assembly 100 discussed above with reference to FIGS. 1A-1C. However, in other embodiments, the method 300 may be employed to use other underwater anchoring assemblies; and thus, may not be limited to any particular structure. The method may include advancing the anchoring assembly 100 into the ground in an unactuated state (FIG. 1A), as at 302. The method 300 may also include positioning the first cross-member 106 above the pipe 110, as at 304. The method 300 may also include rotating the second cross-member 108 about the first pile 102 such that the pipe 110 is interposed between the first and second cross-members 106, 108, as at 306. The method 300 may also include detachably coupling the second end portion 138 of the second cross-member 108 with the second pile 104 via a fastening mechanism (e.g., the U-shaped sleeve 144) to thereby support the pipe 110 with the anchoring assembly 100, as at 308.

Figure 4:
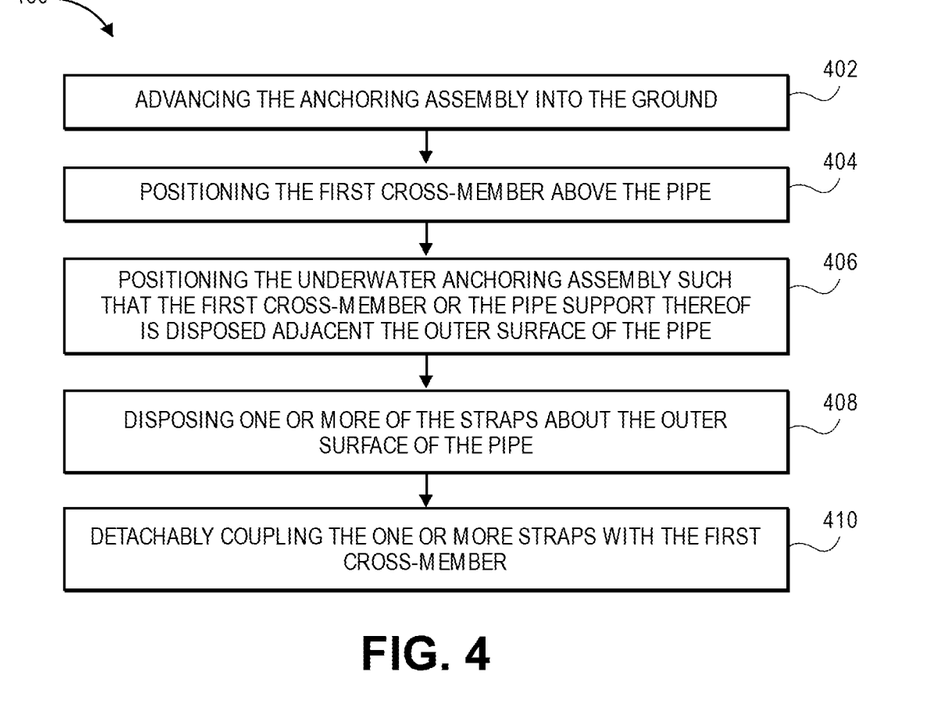
FIG. 4 illustrates a flowchart of a method for supporting a pipe with an underwater anchoring assembly, according to an embodiment.

FIG. 4 illustrates a flowchart of a method 400 for supporting a pipe with an underwater anchoring assembly, according to an embodiment. The method 400 may be employed using one or more embodiments of the underwater anchoring assembly 200 discussed above with reference to FIGS. 2A-2C. However, in other embodiments, the method 400 may be employed to use other underwater anchoring assemblies; and thus, may not be limited to any particular structure. The method 400 may include advancing the anchoring assembly 100 into the ground, as at 402. The method 400 may also include positioning the first cross-member 106 above the pipe 110, as at 404. The method 400 may also include positioning the underwater anchoring assembly such that the first cross-member 106 or the pipe brace 222 thereof is disposed adjacent the outer surface 152 of the pipe 110, as at 406. The method 400 may also include disposing one or more of the straps 202 about the outer surface 152 of the pipe 110, as at 408. The method 400 may also include detachably coupling the one or more straps 202 with the first cross-member 106, as at 410.

The present disclosure has been described with reference to exemplary embodiments. Although a limited number of embodiments have been shown and described, it will be appreciated by those skilled in the art that changes may be made in these embodiments without departing from the principles and spirit of the preceding detailed description. It is intended that the present disclosure be construed as including all such modifications and alterations insofar as they come within the scope of the appended claims or the equivalents thereof.

What is claimed is:

1. An anchoring assembly for supporting a pipe, comprising:
   a first pile configured to be installed into a ground;
   a second pile configured to be installed into the ground;
   a first support coupled with the first and second piles, wherein the first support comprises a first cross-member configured to be disposed above the pipe; and
   a second support at least partially disposed below the pipe and configured to at least partially prevent movement of the pipe relative to the anchoring assembly, wherein:
   the first cross-member comprises a first end and a second end;
   the first support further comprises a first annular sleeve coupled with the first end of the first cross-member, and a second annular sleeve coupled with the second end of the first cross-member;
   the first annular sleeve is received around the first pile, and the second annular sleeve is received around the second pile; and
   the first and second piles are free to rotate with respect to the first cross-member.

2. The anchoring assembly of claim 1, wherein the second support comprises a second cross-member having a first end and a second end, the first end being rotatably coupled with the first pile, and the second end being detachably coupled with the second pile.

3. The anchoring assembly of claim 2, wherein the second support comprises an annular sleeve coupled with the first end of the second cross-member, the annular sleeve being configured to rotatably couple the first end of the second support with the first pile.

4. The anchoring assembly of claim 3, wherein the second support comprises a U-shaped sleeve coupled with the second end of the second cross-member thereof, the U-shaped sleeve being configured to detachably couple the second end of the second cross-member with the second pile.

5. The anchoring assembly of claim 4, wherein the U-shaped sleeve defines a through-hole extending therethrough, wherein the through-hole is configured to receive a latch pin to detachably couple the second support with the second pile.

6. The anchoring assembly of claim 1, wherein the second support comprises a strap disposed partially around the pipe and coupled at both ends thereof with the first support, the strap being configured to secure the pipe to the first support.

7. The anchoring assembly of claim 6, wherein the strap comprises a first coupling member and a second coupling member coupled with a first end and a second end thereof, respectively, each of the first and second coupling members being configured to detachably couple the strap with the first support.

8. The anchoring assembly of claim 7, wherein the first coupling member comprises a tab extending outward therefrom, such that the tab is configured to allow the first coupling member to be manipulated by a remotely operated vehicle.

9. The anchoring assembly of claim 6, further comprising:
   a first pad eye and a second pad eye coupled with the first support; and
   a first shackle and a second shackle coupled with the first pad eye and the second pad eye, respectively,
   wherein a first end portion and a second end portion of the strap are coupled with the first support via the first shackle and the second shackle, respectively, to secure the pipe to the first support.

10. The anchoring assembly of claim 9, wherein the strap comprises a first carabiner and a second carabiner coupled with a first end and a second end thereof, respectively, each of the first and second carabiners being configured to detachably couple the strap with the first shackle and the second shackle, respectively, to secure the pipe to the first support.

11. The anchoring assembly of claim 9, wherein the first pad eye comprises a protrusion extending therefrom in a direction perpendicular to a rotational direction of the first shackle, the protrusion being configured to prevent the over rotation of the first shackle about the first pad eye.

12. An anchoring assembly for a pipe, comprising:
a first pile installed into a ground;
a second pile installed into the ground;
a first cross-member coupled with the first and second piles, wherein the first cross-member is configured to be disposed above the pipe; and
a second cross-member rotatably coupled with the first pile at a first end portion thereof, and detachably coupled with the second pile at a second end portion thereof, wherein the second cross-member is configured to be disposed below the pipe, wherein:
the first cross-member comprises a first end and a second end;
the first cross-member further comprises a first annular sleeve coupled with the first end of the first cross-member, and a second annular sleeve coupled with the second end of the first cross-member;
the first annular sleeve is received around the first pile, and the second annular sleeve is received around the second pile; and
the first and second piles are free to rotate with respect to the first cross-member.

13. The anchoring assembly of claim 12, wherein the second cross-member comprises:
an annular sleeve coupled with the first end portion thereof, the annular sleeve being configured to rotatably couple the second cross-member with the first pile; and
a U-shaped sleeve coupled with the second end portion of the second cross-member, the U-shaped sleeve being configured to detachably couple the second cross-member with the second pile via a fastening mechanism.

14. The anchoring assembly of claim 13, wherein the fastening mechanism comprises:
a through-hole extending through the U-shaped sleeve; and
a pin extending through the through-hole and configured to detachably couple the second cross-member with the second pile.

15. The anchoring assembly of claim 12, wherein the first cross-member is coupled with the first and second piles via a plurality of retainers.

16. The anchoring assembly of claim 12 further comprising a low-friction material interposed between at least one of the first cross-member or the second cross-member and the pipe.

17. A method for supporting a pipe with an anchoring assembly, the method comprising:
advancing the anchoring assembly into the ground in an unactuated state, wherein the anchoring assembly comprises: a first pile, a second pile, a first cross-member coupled with the first and second piles, the first cross-member comprising a first end and a second end, the first cross-member comprising a first annular sleeve coupled with the first end of the first cross-member, and a second annular sleeve coupled with the second end of the first cross-member, the first annular sleeve is received around the first pile, and the second annular sleeve is received around the second pile, the first and second piles are free to rotate with respect to the first cross-member, and a second cross-member rotatably coupled with the first pile at a first end portion thereof, and detachably coupled with the second pile at a second end portion thereof;
positioning the first cross-member above the pipe;
rotating the second cross-member about the first pile such that the pipe is interposed between the first and second cross-members, after advancing the anchoring assembly into the ground; and
coupling the second end portion of the second cross-member with the second pile via a fastening mechanism to thereby support the pipe with the anchoring assembly, after advancing the anchoring assembly into the ground.

18. The method of claim 17, wherein:
the second end portion of the second cross-member comprises a U-shaped sleeve defining a through-hole extending therefrom; and
detachably coupling the second end portion of the second cross-member with the second pile via the fastening mechanism comprises disposing a latch pin through the through-hole of the U-shaped sleeve.

19. The method of claim 17, further comprising interposing a low-friction material between the first cross-member or the second cross-member and the pipe.

20. An anchoring assembly for supporting a pipe, comprising:
a first pile configured to be installed into a ground;
a second pile configured to be installed into the ground;
a first support coupled with the first and second piles, wherein the first support comprises a first cross-member configured to be disposed above the pipe; and
a second support at least partially disposed below the pipe and configured to at least partially prevent movement of the pipe relative to the anchoring assembly,
wherein the second support comprises a second cross-member having a first end and a second end, the first end being rotatably coupled with the first pile, and the second end being detachably coupled with the second pile,
wherein the second support comprises an annular sleeve coupled with the first end of the second cross-member, the annular sleeve being configured to rotatably couple the first end of the second support with the first pile, and
wherein the second support comprises a U-shaped sleeve coupled with the second end of the second cross-member thereof, the U-shaped sleeve being configured to detachably couple the second end of the second cross-member with the second pile.

21. An anchoring assembly for supporting a pipe, comprising:
a first pile configured to be installed into a ground;
a second pile configured to be installed into the ground;
a first support coupled with the first and second piles, wherein the first support comprises a first cross-member configured to be disposed above the pipe;
a second support at least partially disposed below the pipe and configured to at least partially prevent movement of the pipe relative to the anchoring assembly,
a first pad eye and a second pad eye coupled with the first support; and a first shackle and a second shackle coupled with the first pad eye and the second pad eye, respectively, wherein the second support comprises a strap disposed partially around the pipe and coupled at both ends thereof with the first support, the strap being configured to secure the pipe to the first support, and wherein a first end portion and a second end portion of the strap are coupled with the first support via the first shackle and the second shackle, respectively, to secure the pipe to the first support.

22. An anchoring assembly for a pipe, comprising:

a first pile installed into a ground;

a second pile installed into the ground;

a first cross-member coupled with the first and second piles, wherein the first cross-member is configured to be disposed above the pipe; and a second cross-member rotatably coupled with the first pile at a first end portion thereof, and detachably coupled with the second pile at a second end portion thereof, wherein the second cross-member is configured to be disposed below the pipe, wherein the second cross-member comprises:

an annular sleeve coupled with the first end portion thereof, the annular sleeve being configured to rotatably couple the second cross-member with the first pile; and a U-shaped sleeve coupled with the second end portion of the second cross-member, the U-shaped sleeve being configured to detachably couple the second cross-member with the second pile via a fastening mechanism.

23. A method for supporting a pipe with an anchoring assembly, the method comprising:

advancing the anchoring assembly into the ground in an unactuated state, wherein the anchoring assembly comprises: a first pile, a second pile, a first cross-member coupled with the first and second piles, and a second cross-member rotatably coupled with the first pile at a first end portion thereof, and detachably coupled with the second pile at a second end portion thereof;

positioning the first cross-member above the pipe;

rotating the second cross-member about the first pile such that the pipe is interposed between the first and second cross-members, after advancing the anchoring assembly into the ground; and coupling the second end portion of the second cross-member with the second pile via a fastening mechanism to thereby support the pipe with the anchoring assembly, after advancing the anchoring assembly into the ground, wherein the second end portion of the second cross-member comprises a U-shaped sleeve defining a through-hole extending therefrom; and wherein detachably coupling the second end portion of the second cross-member with the second pile via the fastening mechanism comprises disposing a latch pin through the through-hole of the U-shaped sleeve.

* * * * *